United States Patent
Van Den Berg et al.

(10) Patent No.: US 7,334,537 B2
(45) Date of Patent: Feb. 26, 2008

(54) METHOD OF MILKING AN ANIMAL AND DEVICE FOR THIS PURPOSE

(75) Inventors: Karel Van Den Berg, Bleskensgraaf (NL); Eduard Lodewijk Meijer, Den Haag (NL); Martinus Petrus Kortekaas, Lisse (NL)

(73) Assignee: Lely Enterprises AG, Zug (CH)

( * ) Notice: Subject to any disclaimer, the term of this patent is extended or adjusted under 35 U.S.C. 154(b) by 189 days.

(21) Appl. No.: 10/939,475

(22) Filed: Sep. 14, 2004

(65) Prior Publication Data

US 2005/0056224 A1   Mar. 17, 2005

(30) Foreign Application Priority Data

Sep. 15, 2003   (NL)   .................................... 1024295

(51) Int. Cl.
  *A01J 3/00*  (2006.01)
(52) U.S. Cl. ................................................ 119/14.02
(58) Field of Classification Search ............. 119/14.02, 119/14.14, 14.47, 14.48, 14.44
  See application file for complete search history.

(56) References Cited

U.S. PATENT DOCUMENTS

| 3,690,300 | A | | 9/1972 | Tonelli | |
|---|---|---|---|---|---|
| 4,306,590 | A | | 12/1981 | Boudreau | |
| 4,838,203 | A | * | 6/1989 | Ellis et al. ................ | 119/14.08 |
| 5,651,329 | A | * | 7/1997 | van den Berg et al. ... | 119/14.02 |
| 5,704,311 | A | * | 1/1998 | van den Berg .......... | 119/14.02 |
| 5,881,669 | A | | 3/1999 | Van den Berg et al. | |
| 5,992,347 | A | * | 11/1999 | Innings et al. ........... | 119/14.07 |
| 6,009,832 | A | * | 1/2000 | Innings et al. ........... | 119/14.02 |
| 6,073,579 | A | * | 6/2000 | Innings et al. ........... | 119/14.02 |
| 6,164,242 | A | * | 12/2000 | Olofsson .................. | 119/14.02 |
| 7,159,538 | B2 | * | 1/2007 | Innings ..................... | 119/14.08 |
| 2003/0226506 | A1 | * | 12/2003 | van den Berg .......... | 119/14.02 |
| 2005/0223998 | A1 | * | 10/2005 | Bosma et al. ............ | 119/14.18 |

FOREIGN PATENT DOCUMENTS

WO   WO 03/055296 A1   7/2003

OTHER PUBLICATIONS

Search Report Issued by Dutch Patent Office.

* cited by examiner

*Primary Examiner*—Yvonne R. Abbott
(74) *Attorney, Agent, or Firm*—David P. Owen; Howney LLP

(57) ABSTRACT

A milking device and method for removing a teat cup from a teat of an animal are disclosed. The teat cup has a teat space for containing a teat and is connected via a milk tube to a vacuum source for generating a milking vacuum. A drawing-away device is provided for drawing the teat cup away from the animal only after a vacuum-lowering device has lowered the milking vacuum in the teat space below a threshold value. The level of vacuum may be measured by means of a vacuum sensor.

29 Claims, 1 Drawing Sheet

METHOD OF MILKING AN ANIMAL AND DEVICE FOR THIS PURPOSE

CROSS REFERENCE TO RELATED APPLICATIONS

This application claims priority from Dutch application number 1024295 filed on 15 Sep. 2003, the contents of which are hereby incorporated by reference in their entirety.

BACKGROUND OF THE INVENTION

1. Field of the Invention

The invention relates generally to milking devices and more particularly to methods and devices for removing a teat cup from the teat of an animal on termination of a milking procedure.

2. Description of the Related Art

Methods of milking animals are known in which a number of teat cups are attached to the teats of the animal to be milked. The teat cups generally have a teat space for receiving a teat, the teat space being connected to a vacuum source via a milk tube. A further pulsation space within the teat cup is subjected to a pulsation vacuum for exerting a squeezing motion on the teat. After connecting the teat cup to the teat, the animal is milked in a milk-drawing step. On completion of the milk-drawing step, the teat cup may be disconnected. In order to facilitate disconnection, the vacuum in the teat space may be reduced in a disconnection-preparing step.

Such a procedure may be found unpleasant by some animals. When the milk-drawing phase has been completed, the milking vacuum is lowered in the disconnection-preparing step by allowing air to flow into the teat cup. Even before the milking vacuum has completely been removed, a drawing force is exerted on the teat cup. The vacuum that is still present in the teat cup also exerts a drawing force on the teat of the animal via the teat cup. In some cases the drawing force on the teat may be very high, which is experienced as unpleasant by the animal. This may be particularly be the case if for any reason little or no air has been able to enter the teat cup.

BRIEF SUMMARY OF THE INVENTION

The present invention addresses these problems by providing an animal-friendly method of disconnecting a teat cup from a teat of an animal, the teat cup having a teat space connected to a vacuum source via a milk tube for applying a vacuum to the teat space, the teat space and the milk tube forming a milking space, the method comprising successively reducing the vacuum in the teat space; and disconnecting the teat cup from the teat only after a vacuum level in the milking space has come below a threshold value. By ensuring that the vacuum level in the milking space has come below the threshold value, excessive forces exerted on the teat may be avoided. By the vacuum level coming below the threshold value is meant that the absolute (air)pressure in the teat cup rises to above the mentioned threshold value.

The vacuum level is preferably measured in a part of the milking space. On the basis of the measured value it is then possible to determine whether the vacuum level has come below the threshold value. Such a method can easily be executed in an electronic manner with the aid of a vacuum sensor. This has the advantage that the threshold value is easily adaptable.

In a further favorable embodiment of the method, the threshold value may depend on the vacuum level at the beginning of the disconnection-preparing step, prior to reducing the vacuum in the teat space. In this manner, after a fixed vacuum lowering, disconnection can start.

In again a further favorable embodiment of the method, the disconnection step follows after the vacuum level has remained below the threshold value longer than a predetermined period of time. Said period of time is preferably adjustable per animal and/or per teat, so that the lowering speed of the vacuum level can be taken into account. With a thin teat said speed will be higher, because in this case more exterior air will be able to leak into the teat space. Such a teat requires a shorter time in order to prevent the teat cup from falling from the teat by its own weight. To this end a counter may be provided for registering a time elapsed since the vacuum level has come below the threshold value, and disconnection may be initiated by the counter.

The threshold value is preferably adjustable per animal or per group of animals. This makes it possible to set the threshold value at a lower vacuum level for sensitive animals, so that the teat cup is drawn from the teat with less force.

According to another embodiment of the method, the lowering speed is adjustable per animal. This makes it possible to lower the vacuum more gradually for sensitive animals.

According to one embodiment, the milking vacuum is lowered by admitting inlet air into a part of the milking space. This has the advantage that the vacuum can be lowered in a controlled manner.

By admitting inlet air via a separate air line the amount and the sort of air to be admitted can be controlled properly. This also provides the freedom of selecting the optimum air inlet place in the milking space.

In a further favorable embodiment, the inlet air is conditioned prior to being admitted. This prevents inter alia contamination of the milking space by dirt present in the inlet air. Conditioned air may also feel more pleasant to the animal.

According to one embodiment, the part of the milking space at which the vacuum is measured is the teat space. Because of the fact that only the vacuum in the immediate vicinity of the teat is relevant to the drawing force exerted by the teat cup, it is advantageous to measure the vacuum level in the teat space.

Because of the fact that in the milk tube there are more possibilities of disposing a sensor, according to again another embodiment the part of the milking space at which the vacuum is measured is the milk tube.

According to a further embodiment of the method, the milking vacuum is lowered by shutting off the milk tube from the vacuum source. To this end, appropriate valves or the like may be provided e.g. in the milk tube between the teat cup and the vacuum source. In general, the point at which the milking vacuum is lowered may be determined e.g. by use of a milk flow meter, whereby preparation for disconnection takes place once the milk flow has fallen below a particular value. Other well known methods for recognizing the end of the milking phase may also be used.

In a particular embodiment, the drawing away takes place while exerting an increasing drawing force in order not to frighten the animal.

The invention further relates to a milking device comprising at least one teat cup for connecting to a teat of an animal, the teat cup comprising a teat space for containing the teat, the device further comprising a milk tube connecting the teat space to a vacuum source and forming together with the teat space a milking space, a drawing-away device for drawing away the teat cup from the animal, a vacuum-lowering device for lowering the milking vacuum in the teat space, a vacuum sensor for measuring the vacuum level in the milking space and emitting a vacuum signal representative of the vacuum level, and a computing device, responsive to the vacuum signal, for activating the drawing-away device when the vacuum level in the milking space has been lowered below a threshold value.

The milking device may further comprise a counter for registering a time elapsed since the vacuum level has come below the threshold value. Preferably, in this case the drawing-away device may be arranged to be activated directly or indirectly on the basis of the time elapsed as registered by the counter.

According to one embodiment the milking device may also comprises an automatic animal recognition device for emitting an animal recognition signal. In this case the threshold value may be adjustable on the basis of the animal recognition signal. The vacuum-lowering device may also be suitable for controlling the speed at which the milking vacuum is lowered, and this speed may be controllable by the animal recognition signal.

According to an alternative embodiment there may be provided an air inlet for admitting inlet air into a part of the milking space such as the teat space or the milking tube. The air inlet may comprise a separate air line that communicates with the milking space. This air line may be connected to a conditioning device for conditioning the inlet air. Such conditioning may include cleaning, sterilizing, filtering, warming, cooling, humidifying etc.

Preferably, the milking space comprises a valve or the like for shutting off the connection with the vacuum source. The valve may thus serve as part of the vacuum-lowering device by which the milking vacuum in the teat space may be reduced. Furthermore, the milking device may be provided with a milk flow meter indicating the flow of milk from the teat and the vacuum lowering device may be actuated by the computing device in response to a signal from the milk flow meter.

In an advantageous embodiment, the drawing-away device may be controllable to draw away the teat cup while exerting an increasing withdrawing force. Control may be provided by the computing device and may be adapted e.g. according to the particular animal or group of animals.

According to an important aspect of the present invention, the milking device may be a robotic device such as a milking robot which automatically connects the at least one teat cup to the teat. Similarly, all of the above mentioned methods may be carried out partially or completely automatically using such a milking robot. It is particularly important in the case of such milking robots that procedures such as teat cup disconnection take place in an animal friendly manner, since there may be no human operator available to attend to animals that are of a nervous disposition or have increased sensitivity.

BRIEF DESCRIPTION OF THE DRAWINGS

The features and advantages of the invention will be appreciated upon reference to the following drawing of an exemplary embodiment of the invention in which.

DESCRIPTION OF ILLUSTRATIVE EMBODIMENTS

Figure 1:
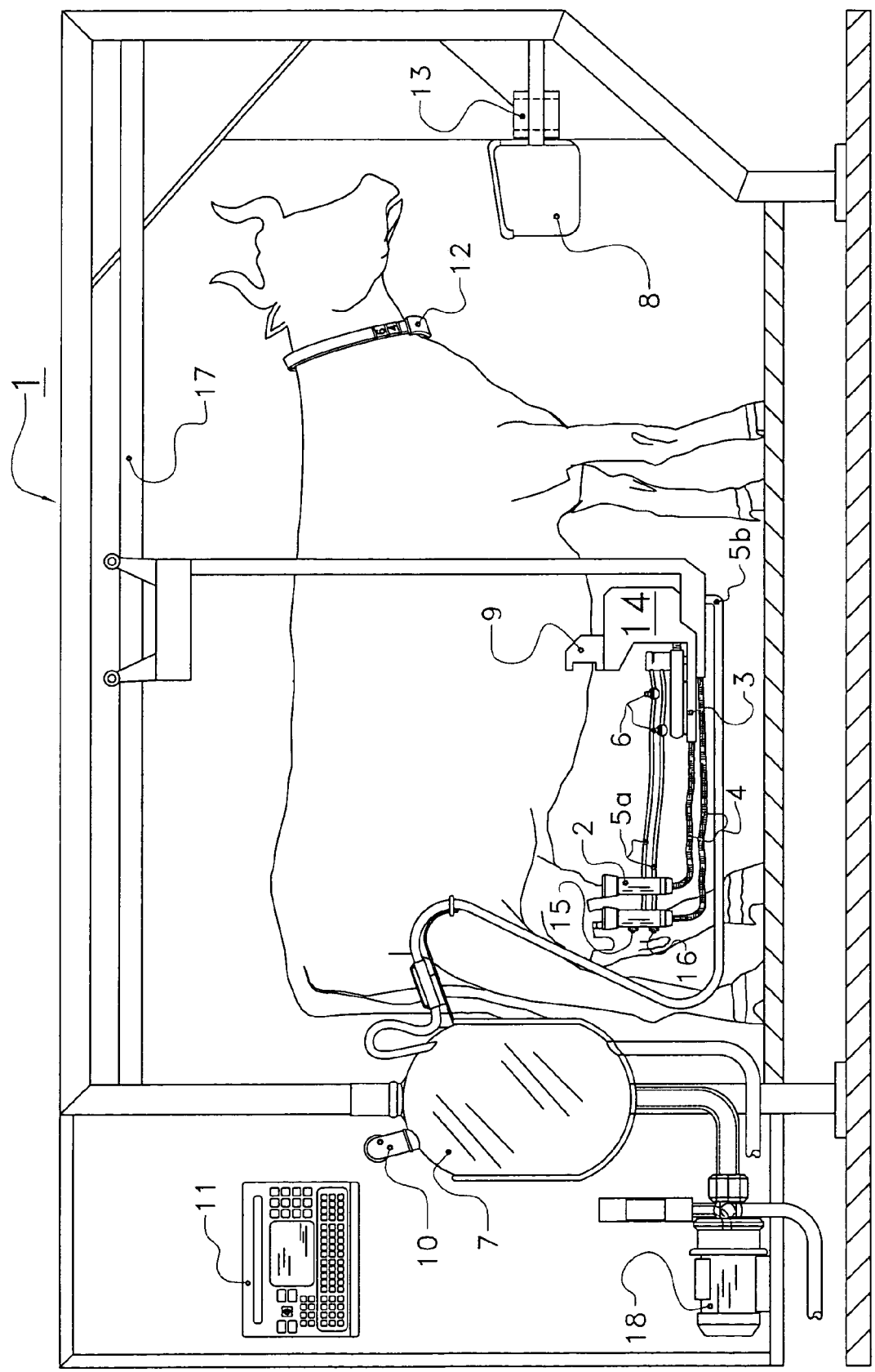
FIG. 1 is a side elevation of a milking device according to one embodiment of the invention.

FIG. 1 shows a milking device 1 provided with a robot 14 for automatically connecting at least one teat cup 2 to a teat of an animal, which teat cup 2 comprises a teat space for containing a teat and a pulsation space for applying a milking motion by means of a pulsating pulsation vacuum, the teat space being connected via a milk tube 5a, 5b to a vacuum source 10 for generating a milking vacuum, the teat space and the milk tube 5a, 5b forming the milking space, with a drawing-away device 3 for drawing away the teat cup 2 from the animal, with a vacuum-lowering device for lowering the milking vacuum in the teat space, with a computer 11 for activating the drawing-away device 3 after the milking vacuum has been lowered, the milking space comprising a vacuum sensor 16 for measuring the vacuum level and emitting to the computer 11 a vacuum signal that is representative of the vacuum level, characterized in that the drawing-away device 3 is capable of being activated by the computer 11 when the vacuum level in the milking space comes below a threshold value.

The milking device 1 comprises an animal area to which the animal to be milked (here depicted as a cow) has access by means of a entrance door (not-shown). There is provided a robot 14 for automatically connecting teat cups 2 to the teats of the animal. To this end, a teat position meter 9 for determining the position of a teat is fitted to the robot 14. Said meter is depicted as a scanning laser, but may comprise any type of position meter. In order to be able to follow movements of the cow in longitudinal direction, the robot 14 is suspended from a rail 17. An animal identification device 13 comprises a transponder 12 fitted to the cow and a transmitter/receiver that is fixedly attached to the milking device 1. The transponder 12 is designed to transmit a unique signal by means of which an individual cow can be recognized. Two of the four teat cups 2 are depicted, said two teat cups being connected to two of the four teats of the cow. The teats are located in the teat spaces of the relevant teat cups 2. Each teat space is connected to the milk glass 7 via a milk tube 5a, 5b. Transport of milk from the teat cup 2 to the milk glass 7 takes place owing to the fact that there is a milking vacuum in said milk glass 7. Said milk glass 7 serves for temporary storage of milk and for separating the air/milk mixture. The vacuum is generated by a vacuum pump fitted to the vacuum source 10. There is provided a milk pump 18 for conveying by pumping the drawn milk for further milk processing. For the purpose of supplying feed in the milking device 1 there is further disposed a manger 8. The components of the milking device 1 are controlled by the computer 11.

To each teat cup 2 there is attached a teat meter 15 for determining the length of the teat. Said teat meter is designed as a series of contactless proximity sensors. The teat position meter 9 scans the teats in the connection step. The scan data may be used by the computer 11 for determining a teat parameter, such as the length or the diameter of the teat. Besides, in the teat space of each teat cup 2 there is disposed a vacuum sensor 16 for detecting the vacuum level in the teat space. The vacuum sensor 16 is disposed in such a way that it cannot come into contact with a teat.

Air can be admitted into the teat space under light overpressure via a air line (not-shown). In this case the air line is connected to a conditioning device (not-shown) in the form of a filter for conditioning the inlet air. The amount of air to be admitted is controllable by the computer 11 by means of a valve.

The milking device 1 comprises a counter (not-shown) for registering the time elapsed since the vacuum level has come below the threshold value, the drawing-away device 3 being capable of being activated by the counter.

The operation of the milking device 1 is as follows. A cow reports at the milking device 1 and is identified. The animal recognition signal is passed to the computer 11 and the latter decides on the basis of known criteria whether the cow should be milked. The entrance door is opened and the connection step is performed. In a known manner said step comprises successively cleaning of the teats, determination of the teat positions, and connection of the teat cups 2 by the robot 14 on the basis of the teat positions. Then the milk-drawing step, the milking proper, is performed. To this end, a pulsating vacuum is applied to the pulsation space, which pulsating vacuum exerts a squeezing motion on the teat. The amount of air that is required for each pulsation motion is an indication of the shape of the teat. By means of a volume meter that is present in the pulse line said air is measured and the measurement result is passed to the computer 11. In case of a thin teat a relatively large quantity of pulsation air may be required for this purpose. By means of a vacuum sensor 16 in the teat space the milking vacuum is also measured. Said milking vacuum is compared with the measured vacuum of the vacuum source 10. A substantial difference is an indication of significant leakage of air along the teat.

In general there may be distinguished different phases in drawing milk from an animal. There is a start-up phase with increasing milk flow, a main milking phase in which the milk flow is more or less constant, and a final phase with decreasing milk flow when the udder is almost empty. On the basis of the data from the milk flow meter (not-shown) the computer 11 can determine in which phase the milk-drawing is. If this is the main milking phase, the measured pulsation amount and the measured milking vacuum are considered as relevant.

The obtained measurement data are stored in the memory of the computer 11 and are used for future milkings.

When the milk flow has fallen below a particular value, the disconnection-preparing step begins. The milking vacuum is stopped by shutting the valve 6 in the milk tube 5*a*.

The vacuum sensor 16 measures the vacuum in the teat space. When the vacuum has fallen below a threshold value, the disconnection step begins. The threshold value may be manually inputted beforehand into the memory of the computer 11 for a particular animal or group of animals, for example animals of a particular age. The threshold value may also be set by the computer 11 itself on the basis of other data from the memory. For example, when a (beginning) mastitis infection has been diagnosed in an udder quarter, the computer 11 decides to set the threshold value at a lower vacuum level (higher pressure). In that case also the speed at which the vacuum is lowered is set at a lower level by the computer 11 with the aid of the vacuum-lowering device. The valve in the inlet line constitutes part of said vacuum-lowering device. By not entirely opening said valve and by closing the valve 6 in the milk tube 5*a* only slowly, it is achieved that the milking vacuum is lowered only very slowly. Lowering the vacuum more slowly also takes place if the animal to be milked is very sensitive.

At the moment when the milking vacuum comes below the threshold value, the counter is activated. When a fixed time, for example 2 s, has elapsed, the counter activates the drawing-away device 3 to disconnect the teat cups 2 and the disconnection step begins to disconnect the teat cups 2 from the teats. In the FIGURE shown, this takes place actively by pulling the teat cups 2 towards the robot arm by means of the cords 4. For this purpose, each cord 4 is attached to a separately operable drawing-back cylinder(not-shown) which may be pneumatic, hydraulic or the like. Because of the fact that each udder quarter will empty at a different point of time, each teat cup 2 can be disconnected independently of the others. The force and speed at which a teat cup 2 is drawn away may be set differently per teat cup 2.

In a non-shown embodiment, the disconnection step is carried out by the cow herself. In this case the exit door (not-shown) of the milking device 1 is opened by the computer 11 after the waiting time has elapsed, so that the cow can leave the milking device 1. When leaving the milking device 1 the cow herself loosens the teat cups 2 that are still connected to her teats. This may take place, if desired, in combination with the active withdrawal of the teat cups 2 by the robot 14. If the cow leaves the milking device 1 insufficiently quickly, a driving-out device (not-shown) may still be activated, if desired.

Many modifications in addition to that described above may be made to the structures and techniques described herein without departing from the spirit and scope of the invention. Accordingly, although specific embodiments have been described, these are examples only and are not limiting upon the scope of the invention.

What is claimed is:

1. A method of disconnecting a teat cup from a teat of an animal, the teat cup having a teat space connected to a vacuum source via a milk tube for applying a vacuum to the teat space, the teat space and the milk tube forming a milking space, the method comprising successively:
   reducing the vacuum in the teat space;
   determining when a vacuum level in the milking space has come below a threshold value; and
   disconnecting the teat cup from the teat by activating a drawing-away device to actively draw away the teat cup only after the vacuum level in the milking space has come below the threshold value.

2. The method as claimed in claim 1, wherein the vacuum level is measured in a part of the milking space.

3. The method as claimed in claim 2, wherein the part of the milking space is the teat space.

4. The method as claimed in claim 2, wherein the part of the milking space is the milk tube.

5. The method as claimed in claim 1, wherein the threshold value depends on a vacuum level prior to reducing the vacuum in the teat space.

6. The method as claimed in claim 1, wherein disconnection follows after the vacuum level has been below the threshold value for longer than a predetermined time.

7. The method as claimed in claim 1, wherein disconnection is performed automatically with the aid of a robot.

8. The method as claimed in claim 1, wherein the animal itself is enabled to carry out at least partially the disconnection by making a movement.

9. The method as claimed in claim 1, wherein the threshold value is adjustable per animal or per group of animals.

10. The method as claimed in claim 9, wherein the animal is identified automatically.

11. The method as claimed in claim 9, wherein the speed at which the vacuum level is reduced is adjustable per animal or per group of animals.

12. The method as claimed in claim 1, wherein the vacuum level is reduced by admitting inlet air into a part of the milking space.

13. The method as claimed in claim 12, wherein the inlet air is admitted via a separate air line.

14. The method as claimed in claim 13, wherein the inlet air is conditioned prior to being admitted.

15. The method as claimed in claim 1, wherein the vacuum level is lowered by shutting off the milk tube or the teat space from the vacuum source.

16. The method as claimed in claim 1, wherein the drawing away takes place while exerting an increasing drawing force.

17. A milking device for performing the method according to claim 1 comprising: at least one teat cup for connecting to a teat of an animal, the teat cup comprising a teat space for containing the teat; a milk tube connecting the teat space to a vacuum source, the teat space and the milk tube forming a milking space; a drawing-away device for drawing away the teat cup from the animal; a vacuum-lowering device for lowering the milking vacuum in the teat space; a vacuum sensor for measuring the vacuum level in the milking space and emitting a vacuum signal when the vacuum level in the milking space has been lowered below a threshold value; and a computing device, responsive to the vacuum signal, and activating the drawing-away device to actively draw away the teat cup from the animal.

18. The milking device as claimed in claim 17, wherein the milking device comprises a counter for registering a time elapsed since the vacuum level has come below the threshold value, and in tat the drawing-away device is capable of being activated by the counter.

19. The milking device as claimed in claim 17, wherein the milking device further comprises an automatic animal recognition device for emitting an animal recognition signal, and in that the threshold value is adjustable on the basis of the animal recognition signal.

20. The milking device as claimed in claim 19, wherein the vacuum-lowering device is suitable for controlling the speed at which the milking vacuum is lowered, and in that the speed is controllable by the animal recognition signal.

21. The milking device as claimed in claim 17, wherein there is further provided an air inlet for admitting inlet air into a part of the milking space.

22. The milking device as claimed in claim 21, wherein the air inlet comprises a separate air line that communicates with the milking space.

23. The milking device as claimed in claim 22, wherein the air line is connectable to a conditioning device for conditioning the inlet air.

24. The milking device as claimed in claim 21, wherein the part of the milking space is the teat space.

25. The milking device as claimed in claim 21, wherein the part of the milking space is the milk tube.

26. The milking device as claimed in claim 21, wherein the milking space comprises a valve for shutting off the connection with the vacuum source.

27. The milking device as claimed in claim 17, wherein the drawing-away device is controllable to draw away the teat cup while exerting an increasing withdrawing force.

28. The milking device as claimed in claim 17, further comprising a robot for automatically connecting the at least one teat cup to the teat.

29. A method of milking an animal by means of a milking device provided with at least one teat cup having a pulsation space and a teat space, the teat space being connected to a vacuum source via a milk tube, the teat space and the milk tube forming a milking space, the method comprising successively: a connection step in which the teat cup is connected to the teat; a milk-drawing step in which a pulsating pulsation vacuum is applied to the pulsation space and a milking vacuum is applied to the teat space; a disconnection-preparing step in which the milking vacuum is lowered; and a disconnection step in which the teat cup is actively drawn away from the teat on determination that the vacuum level in the milking space has come below a threshold value during the disconnection-preparing step.

* * * * *